(12) United States Patent
Angelis et al.

(10) Patent No.: US 7,109,882 B2
(45) Date of Patent: Sep. 19, 2006

(54) UTILITY ENDPOINT COMMUNICATION SCHEME, SUCH AS FOR SEQUENCING THE ORDER OF METER READING COMMUNICATIONS FOR ELECTRIC, GAS, AND WATER UTILITY METERS.

(75) Inventors: Bruce Angelis, Spokane, WA (US); Robert Simon, Rathdrum, ID (US)

(73) Assignee: Itron, Inc., Spokane, WA (US)

( * ) Notice: Subject to any disclaimer, the term of this patent is extended or adjusted under 35 U.S.C. 154(b) by 0 days.

(21) Appl. No.: 11/064,433

(22) Filed: Feb. 22, 2005

(65) Prior Publication Data

US 2005/0184882 A1 Aug. 25, 2005

Related U.S. Application Data

(60) Provisional application No. 60/546,039, filed on Feb. 19, 2004.

(51) Int. Cl.
*G08B 23/00* (2006.01)
*G08C 15/06* (2006.01)

(52) U.S. Cl. .......................... 340/870.02; 340/870.11; 700/89

(58) Field of Classification Search .......... 340/870.02, 340/870.11; 700/89
See application file for complete search history.

(56) References Cited

U.S. PATENT DOCUMENTS 6,657,549 B1 * 12/2003 Avery .................... 340/825.49
2005/0023347 A1 * 2/2005 Wetzel et al. ............... 235/385
2005/0222933 A1 * 10/2005 Wesbey .......................... 705/36

OTHER PUBLICATIONS

BadgerMeter, Inc., "TRACE® Automated Meter Reading System, Vehicle Interactive Display (VID), Techincal Brief," Milwaukee, WI, Jun. 2002, 1 page.
BadgerMeter, Inc. "TRACE® Automated Meter Reading System, Operation Brief,"Milwaukee, WI, Dec. 2001, 2 pages.
BadgerMeter, Inc., "TRACE® Automated Meter Reading System, MODEL MMI Mini Mobile Interrogator, Technical Brief," Milwaukee, WI, Dec. 2001, 2 pages.
AMCO Automated Systems, LLC, "Vehicular Interactive Display (a Mini Mobile Interrogator option), " Scott Depot, WV, Sep. 2002, 2 pages.
AMCO Automated Systems, LLC, "TRACE Automated Meter Reading Systems, TRACE™ VRT™—mobile AMR system," Scott Depot, WV, Apr. 2003, 2 pages.

* cited by examiner

*Primary Examiner*—Timothy Edwards, Jr.
(74) *Attorney, Agent, or Firm*—Perkins Coie LLP

(57) ABSTRACT

A method and system for reading endpoints used for tracking consumption of a utility may allow the sequencing of meters/endpoints in a meter reading route, such as a mobile automatic meter reading route. The sequencing may include receiving an indication of a collection of endpoints comprising a meter reading route, wherein each endpoint stores utility consumption data, then executing the meter reading route. Executing the meter reading route may include identifying and reading a first endpoint on the meter reading route, receiving input used in identifying a next endpoint to be read on the meter reading route, identifying a next endpoint to be read on the meter reading route based on the received input, and reading the identified next endpoint. One or more of these tasks may be performed repeatedly until all the endpoints on the meter reading route are read or otherwise acknowledged as unreadable, etc.

31 Claims, 8 Drawing Sheets

UTILITY ENDPOINT COMMUNICATION SCHEME, SUCH AS FOR SEQUENCING THE ORDER OF METER READING COMMUNICATIONS FOR ELECTRIC, GAS, AND WATER UTILITY METERS.

CROSS-REFERENCE TO RELATED APPLICATION

This application claims the benefit of commonly owned U.S. Provisional Patent Application No. 60/546,039, filed Feb. 19, 2004, which is herein incorporated by reference.

BACKGROUND

Utility companies typically rely on meter reading to determine consumption of a utility by its customers. In some utility meter reading applications, operators drive vehicles equipped with radio-equipped data collection units around an area or route to read electric, gas, and/or water meters. The meters are equipped with modules that allow them to send and receive signals. This style of meter reading, sometimes referred to as mobile AMR (automatic meter reading), allows meter reading to be completed without direct access to the meter.

Mobile AMR is sometimes used in saturated areas where there may be large populations of meters, difficult-to-access meters, or hazardous-to-read meters. When used in such areas, mobile AMR can dramatically improve meter reading efficiency. For example, a single data command unit transceiver reads an average of 10–12,000 meters in an eight-hour shift, and can read up to 24,000 meters per day, depending on meter density and system use. A portable DataPac® (Itron, Inc. of Spokane, Wash.) reads an average of 4,000 to 5,000 meters per day.

Routes for mobile AMR are typically defined geographically and may include hundreds or thousands of meters. Typically, in cases where meters are equipped with features that allow for point-to-point communication, each meter (or endpoint) in the route is read in turn (sequentially). To determine the order in which endpoints in the route are read, mobile AMR systems rely on sequential lists that identify each endpoint using a unique address assigned to the endpoint. The sequential list is formulated in advance and based on the geographic location of each endpoint relative to other endpoints in the route. For example, a mobile AMR route may have starting and ending points, and endpoints are read according to proximity from a vehicle moving between the starting and ending points. When using this technique, the data collection unit installed on the vehicle must know each endpoint address in its route. During the sequential reading of endpoints on a route, the driver typically relies on a visual display of addresses to determine if an endpoint has been successfully read. Such lists can be lengthy if the route contains many endpoints. If a reading fails with respect to any given endpoint, the operator aboard the vehicle will typically initiate a reread of the endpoint by providing its address.

Where meters are read using non-point-to-point techniques, such as with conventional "wake-up" or "bubble-up" techniques, there is no implied sequence of meters read in a route. At best, an operator (e.g., a driver or meter reader) is instructed to proceed with a vehicle (or on foot) in a certain direction or area). For example, an operator is instructed to drive certain streets in order. During this process the mobile collector in the vehicle sends out wake up tones and waits for meters to respond or simply listens for broadcasts from bubble up meters. As meters wake up and send their data, the mobile collector grabs the data and posts it against the correct position in the route. At the end of this process, the operator may perform a process to identify any "missed" reads in the area prior to leaving the area or street.

The way this is accomplished may vary, depending on whether the system is capable of point-to-point communications with meters. Identifying missed meter reads in point-to-point systems may involve having the driver identify the street address of the location where the meter has not been read and driving by that location again while the radio is operating. During this process, the radio tries to communicate with any meters in the area by waking them up, as described above.

DETAILED DESCRIPTION

Figure 1:
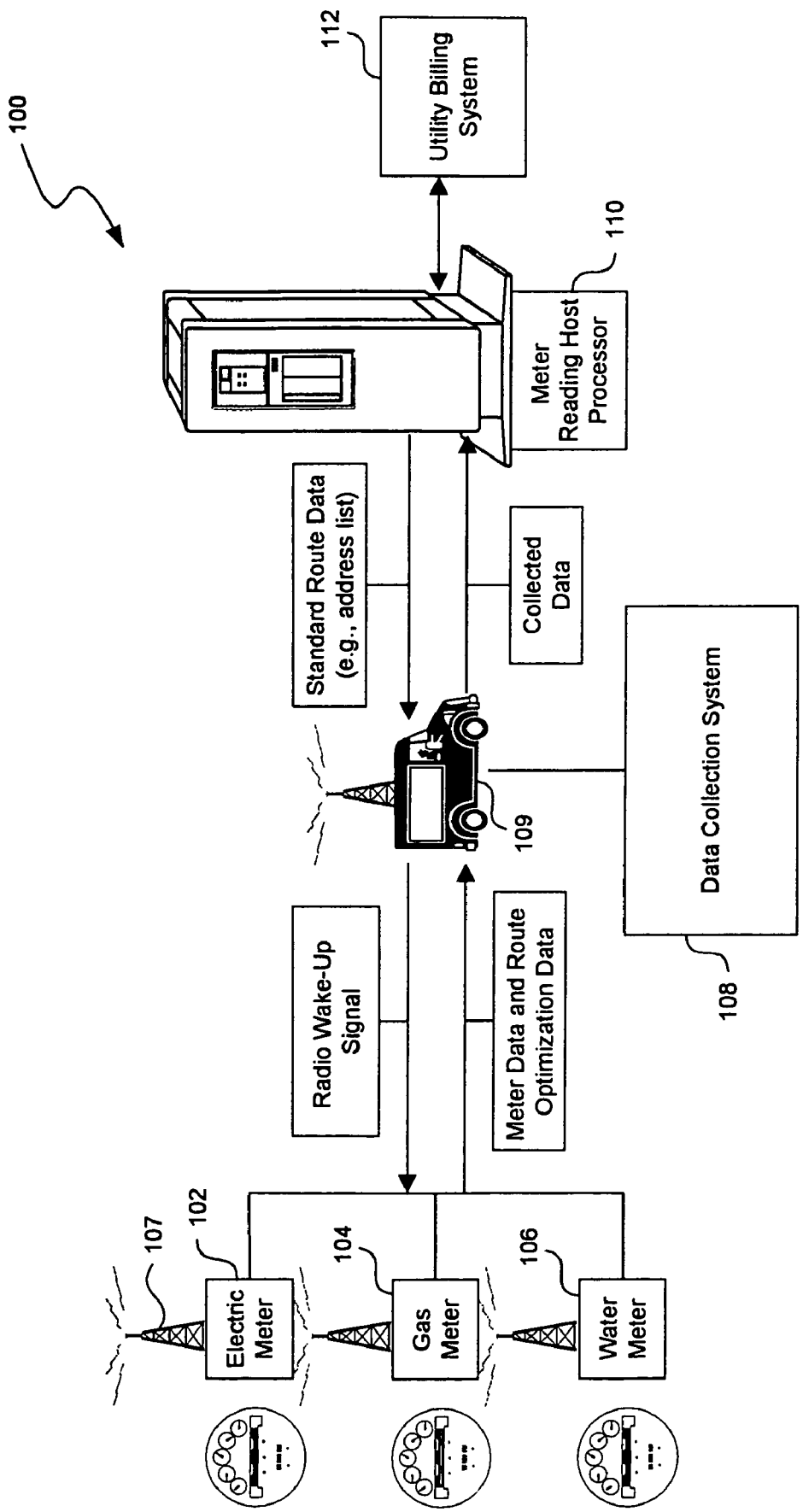
FIG. 1 is a block diagram showing an example of a meter reading system in which one embodiment of the invention can be implemented.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

Embodiments of the invention, described below, include a system and method for improving the efficiency of communication sessions between a mobile data collection system and utility meters (or endpoints) equipped with modules for sending and receiving data over a wireless link. For example, the communication may involve communication regarding monitoring quality factors of the distribution system, outage information, consumption information, etc. In some embodiments, the communications between the mobile data collection system and the endpoints may be point-to-point, so that the mobile data collection system can elect to communicate with specific meters having, for example, addressable modules for sending and receiving data over a wireless link.

The mobile data collection system may be located in a vehicle and operated by an operator. At a route start location, the mobile data collection system determines its own current location. The mobile data collection system, on board the vehicle, then proceeds along a path in the route. Instead of reading a predetermined sequence of meters, the mobile data collection system chooses the best meter in its range and attempts communication. The success of this communication attempt is evaluated. Upon completion of the evaluation, the next likely candidate for point-to-point communication is determined. Throughout this process, the mobile data collection system gathers and stores various types of information (in addition to consumption data from the meters themselves) so it can effectively sequence/resequence communications and, in some embodiments, be used to intelligently reconfigure routes.

In determining an optimal sequence for endpoint communications, the mobile data collection system may collect, process, and store various types of information (real-time and historical) including return signal strength indicator (RSSI) data, latitude/longitude data, sequence data for a particular route, data concerning the current location or velocity of the mobile data collection system, the type of data to be sent or received, data from interferors (e.g., RF emissions, a factory outputting smoke or generating emissions, etc.), temperature data, weather data, speed of the mobile data collection system as it moves through the route, data concerning terrain or topology, street layouts, etc. Much of this information is gathered and processed "on the fly" to determine an optimal sequence for endpoint communications. In this way, the next endpoint to be read on a route is not fixed and is, instead, based on the best candidates for overall route efficiency given current conditions.

In some embodiments, endpoints are configured in using a "mesh network" configuration, where endpoints have peer-to-peer capability. In a mesh network configuration, the mobile data collection system need only communicate directly with a sub-set of endpoints delegated as hubs, or concentration points for a series of peer-to-peer endpoints in the mesh network.

The information collected during the route can be used for subsequent planning. For example, it can be used to improve the geographic routes that operators use to provide driving directions. In this way, the information can be valuable even when needing to more statically sequence non-point-to-point endpoint routes.

II. System Architecture

FIG. 1 is a block diagram of an embodiment of a meter reading system 100. The system 100 is an example of one arrangement of elements, but others are possible. The system, 100 includes a collection of endpoints, in this case, utility meters (102, 104, and 106). The utility meters may be of the same or different types (e.g., electric 102, gas 104, water, 106, or other (not shown)). The utility meters (102, 104, and 106) may be distributed in a bounded or unbounded geographical area. Each utility meter (102, 104, and 106) is connected to or associated with a utility consuming facility (not shown). For example, a utility meter may correspond with a household, a commercial facility, or another utility consuming facility or device.

While not illustrated in detail, each meter is equipped with a receiver/transmitter telemetry device 107 capable of sending and receiving signals to and from a data collection system 108. More specifically, a transmitter at the meter transmits collected meter reading data to a data collection device. A receiver at the meter receives signals from meter collection devices, for example, signaling the meter to provide meter reading data. The meter also includes a storage component (not shown) for storing collected data before transmission to the data collection system 108. The storage may also include information identifying the meter, such as a meter address. In systems where meters are capable of point-to-point communications, the meter address may be used to initiate contact with that particular meter, and to otherwise facilitate point-to-point communication with the data collection system 108.

To facilitate mobile AMR or similar techniques, the data collection system 108 may be installed in a vehicle 109 or be otherwise configured to be transported through an area. In some embodiments the vehicle may proceed along a predetermined route. The data collection system 108 may be capable of point-to-point communications with specific endpoints (e.g., meters 102, 104 and 106). In some embodiments, the data collection system 108 can also send radio wake-up signals to non-addressable meters on a route as a way to prompt them to send data. In alternative embodiments, "bubble-up" (broadcast) techniques may be used instead of, or in addition to, "wake-up" or point-to-point techniques. The data collection system 108 is described in more detail with respect to FIG. 2.

The system 100 also includes a host processing system 110 for processing various types of data collected from endpoints. The host processing system 110 may be operating in association with systems operated by a utility company, such as a utility billing system 112. In this way, the host processing system 110 can also be used to communicate data to the data collection system 108. This information may include standard route data and data analysis of previous executions of the routes.

Figure 2:
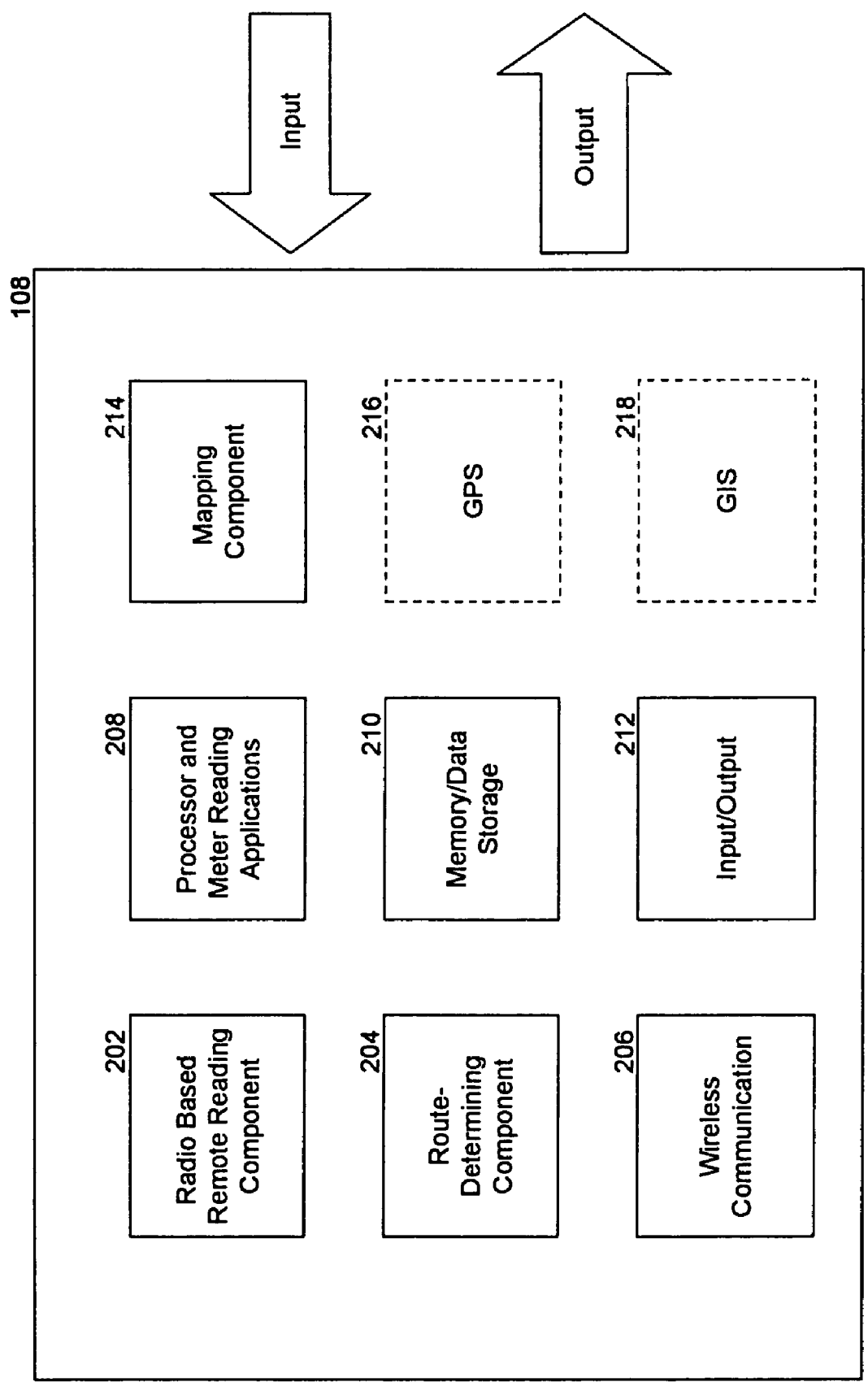
FIG. 2 is a block diagram showing an example of the data collection system of the meter reading system of FIG. 1.

Referring to FIG. 2, the data collection system 108 of FIG. 1 is shown in more detail. The data collection system 108 includes a remote reading component 202 (e.g., radio based) and a sequencing component 204. In some embodiments, these two portions of the data collection system 108 may effectively be combined into a single device, because many of the features required for collecting data from endpoints are also useful in collecting data used in determining an optimal sequence for communicating with such endpoints. Here, however, they are illustrated separately to demonstrate the distinct functions of the two components.

The data collection system 108 also includes a wireless component 206, which, in some embodiments, may include an antenna and a transceiver (not shown). The transceiver of the wireless component 206 sends signals to wake up endpoints that function in "wake-up" mode and to receive and manage incoming data. A processor and meter-reading applications 208 provide capabilities to control several processes, including management of collected data and processing of input for purposes of determining an efficient sequence for communicating with endpoints.

The data collection system 108 may store collected data in a memory or other storage device 210 associated with the data collection system 108, such as a non-volatile memory. For example, the memory 210 can store not only collected meter data, but also route information, performance and communications statistics and history. This information may be used as input to 204 to determine efficient sequences for communicating with endpoints. Such algorithms may include inference and proximity algorithms described herein.

A user input/output component 212 provides an appropriate user interface for an operator of the data collection system 108. For example, the data collection system 108 may provide a color touchscreen display for ease of use and clear graphical mapping displays. Other user input/output options are possible, including mouses, microphones, speakers, joysticks, keyboards, LCD screens, audio, etc. One application of the input/output component 212 includes displaying and controlling mapping images generated by a mapping component 214. In this way, the operator is provided with feedback, so that he or she can determine which meter readings have been completed on a particular route and so he or she can view endpoints on the route in relation to the vehicle and to other endpoints. While Global Positioning System (GPS) 216 or Geographical Information System (GIS) 218 components may also be included, mapping may be done without the use of a GPS 216 as described in more detail herein.

III. Input for Sequencing/Resequencing

Figure 3:
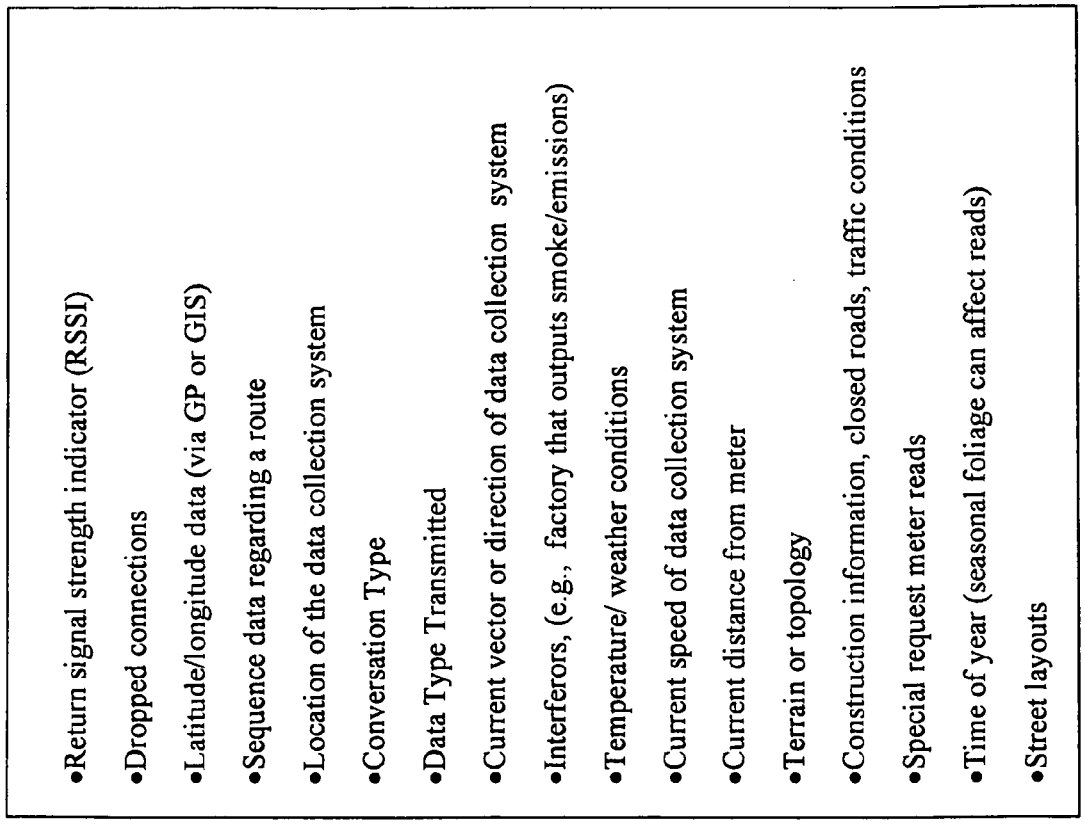
FIG. 3 is block diagram showing an example of the input received by the sequencing component of the data collection system of FIGS. 1 and 2.
Figure 3:
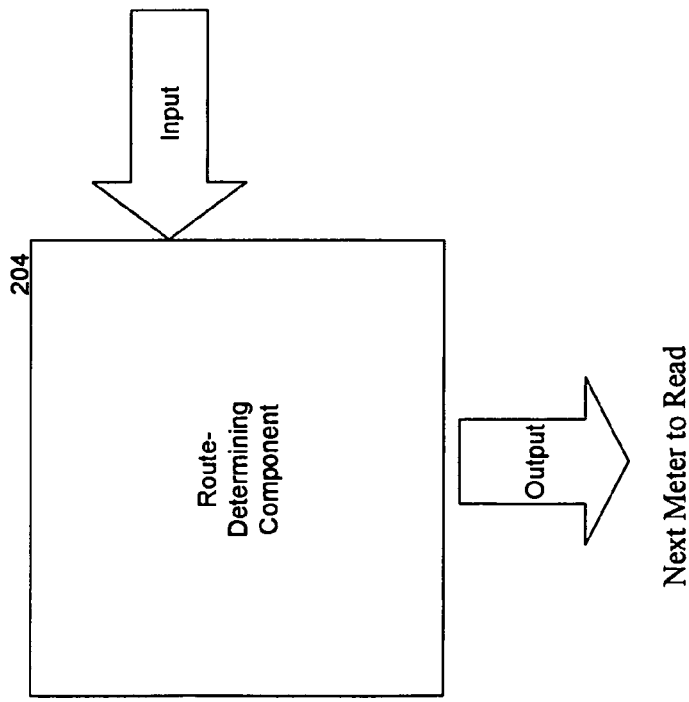

Referring to FIGS. 2 and 3, the illustrated sequencing component 204 may use one or more algorithms in sequencing/resequencing point-to-point communication targets and route of travel through the vicinity. For example, an inference algorithm combines real-time GPS location, manual contacts, historical/recent contacts, and/or RF reliability statistics to reduce the backtracking activity of the algorithm. The algorithm may consider contacts made either by solicited (e.g., wake-up or point-to-point) or broadcast (e.g., bubble up) endpoints. The algorithm may also consider known modules that have yet to be contacted in initial communication activities. In a situation where there are multiple endpoint candidates for point-to-point communication, the algorithm cycles around such possible candidates based on information about the data collection system's current location in the route. It can do this with or without real-time GPS coordinates. Link level reliability can be used to reject meter candidates in certain circumstances.

The primary algorithm used by the system is an active and tunable algorithm that learns and remembers each time it proceeds through the route. This allows it to compensate for module density, building density, terrain, foliage, etc. In one application, the algorithm determines a RF candidate endpoint based on the distance between the candidate and the data collection system 108. It does this by drawing a virtual circle around the data collection system 108 or reader with a configurable radius (for tuning) to discover the candidates within range of the reader (see FIG. 6). The algorithm can then be adjusted based on the direction of travel of the reader in the vehicle.

As shown in FIG. 3, several types of information may be collected and used by the algorithms of the sequencing component 204 of the data collection system 108. For example, the one or more algorithms discussed above may be sensitive to various types of location and RF quality information. This may include historical RF session statistics from previous route executions or surveys, real-time GPS location, coordinates of previous manual reads, coordinates of previous successful RF sessions, coordinates of previously unsuccessful RF sessions, coordinates of other known communicating infrastructure components (such as pole mounted data concentrators), etc. Various examples of such information are illustrated in FIG. 3. For example, the algorithm may be sensitive to return signal strength indicator (RSSI) information collected from each meter on the route. In addition, it may be sensitive to any information regarding dropped connections (e.g., the route-determining component loses a connection with a transmitter of the meter).

Figure 4:
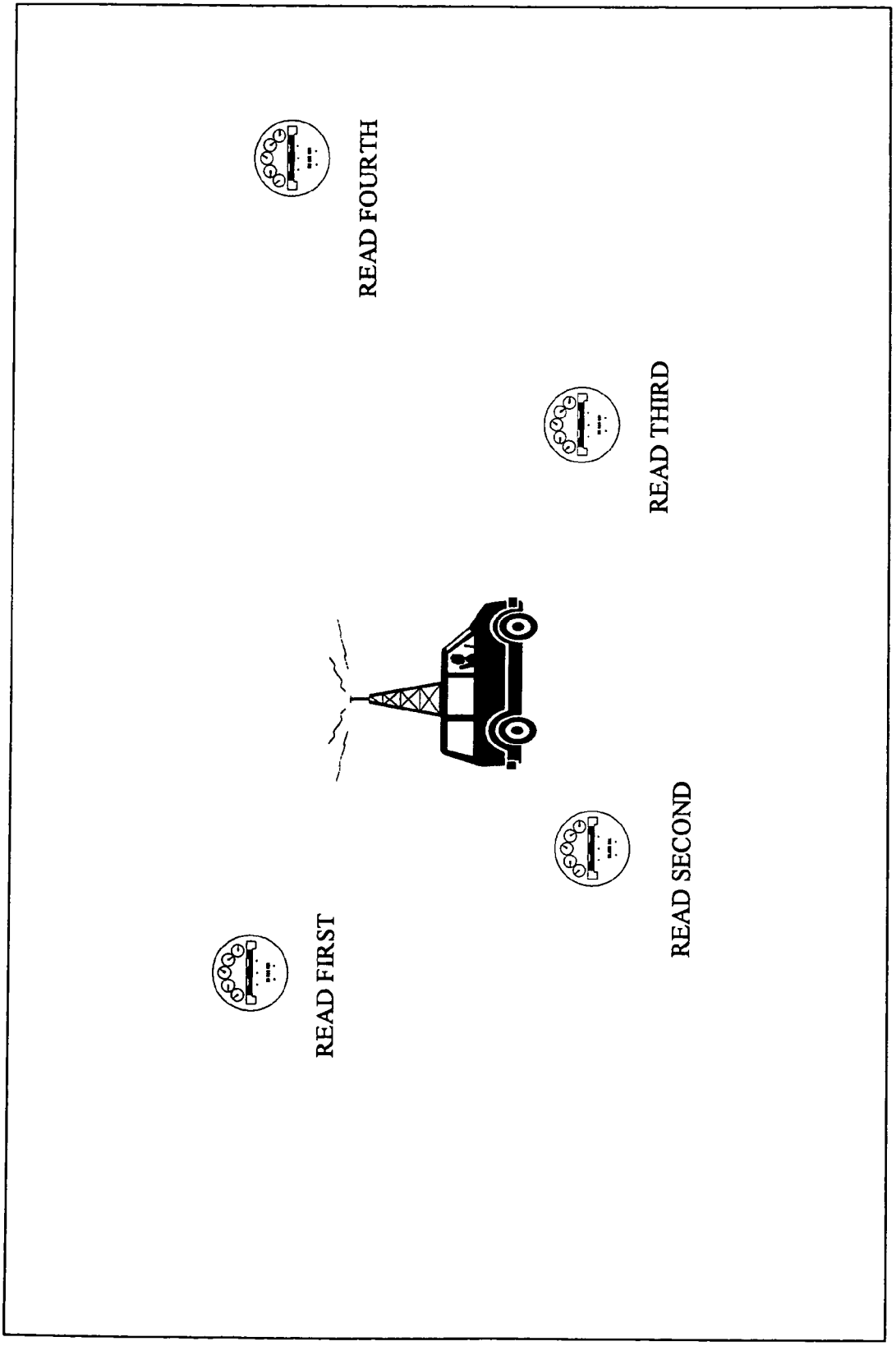
FIG. 4 shows an example of a sequence for reading meters in a route where one embodiment of the invention is implemented.

Because the data collection system 108 may be on board a vehicle of varying speed and direction, real-time speed of the data collection system 108 and associated directional information (e.g., vectors and predetermined route of travel) may be another factor used in the sequencing algorithms. Likewise, the algorithms may consider real-time distance, or distance between the data collection system 108 and the endpoint to be read. As shown in FIG. 4, it is not always the endpoint/meter with the closest signal that should be read first. For example, in some situations, an endpoint that is a farther distance behind the data collection system 108 may be read before an endpoint that is closer, because the further away endpoint will go out of range sooner.

Some of the other types of information that may be considered by the sequencing component 204, and illustrated in FIG. 3, include information regarding the latitude and longitude of the data collection system's current location. Such information can be determined via global positioning system (GPS) and possibly geographic information system (GIS) data. The sequencing component 204 may also store in memory information about the route such as each endpoint's positional relation to other endpoints in the route and distance between endpoints.

Figure 5:
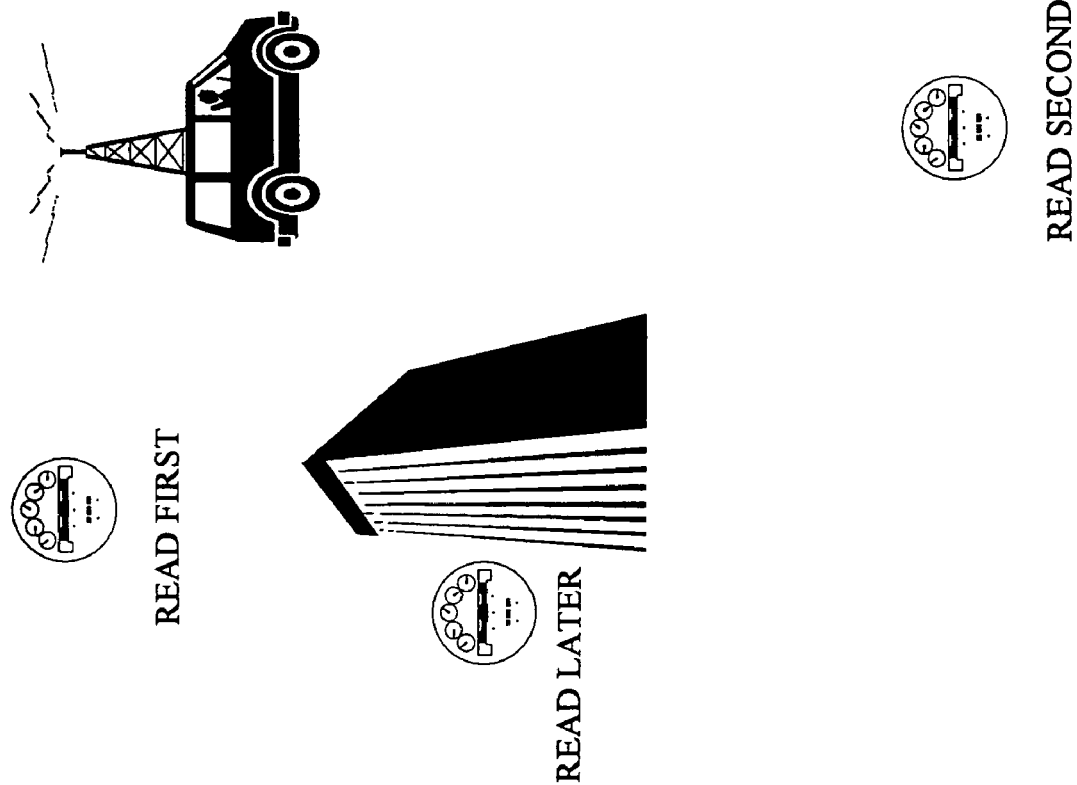
FIG. 5 shows a second example of a sequence for reading meters in a route where one embodiment of the invention is implemented.

Because communication with endpoints may occur in a variety of contexts, the type of conversation to be entered into with respect to a given endpoint may also play a role in determining the sequence for reading endpoints in a route. In addition, the vector or direction of the data collection system 108 while traveling a route may also be a factor in determining the sequence for endpoint communications. Another factor having an effect on the sequence for endpoint communications reads may be radio frequency interferors, such as microwave towers, or even a large structure, such as a building, as shown in FIG. 5. In such a case, a mobile data collection system would read an endpoint that is further away before reading a nearby endpoint that is obstructed by the interference. The mobile data collection system could then read the nearby endpoint after the obstruction is no longer at issue. Temperature variations, as well as weather conditions or other environmental factors, may have an effect on endpoint communication success. Accordingly, the algorithms of the sequencing component may also consider these factors when determining which endpoint to read next.

Because factors such as terrain, topology, and the layout of roads in the area may also have an effect on a route and the sequence of endpoint communications, this may also be taken into consideration in the sequencing algorithm and also in route determination. For example, while road layout may indicate to take a high road through a given area, if certain meters cannot be read because of bumps or a hill, the low road may be preferable. Up-to-date construction information, road closure information, and traffic conditions may also result in a variation in route. For these reasons, this information may be retrieved from appropriate sources (e.g. from certain internet sites) and used by the sequencing algorithm and in route finding. In addition, factors such as seasonal conditions, including excessive seasonal foliage, may have a significant effect on meter reading success and, thus, may also be taken into consideration by the algorithm. In certain circumstances, such as during power outages or for special requests, only select endpoints on a particular route are singled out for communication. In such a case, a list of "on request reads" may be provided to the system to indicate which endpoints are to be read.

Figure 6:
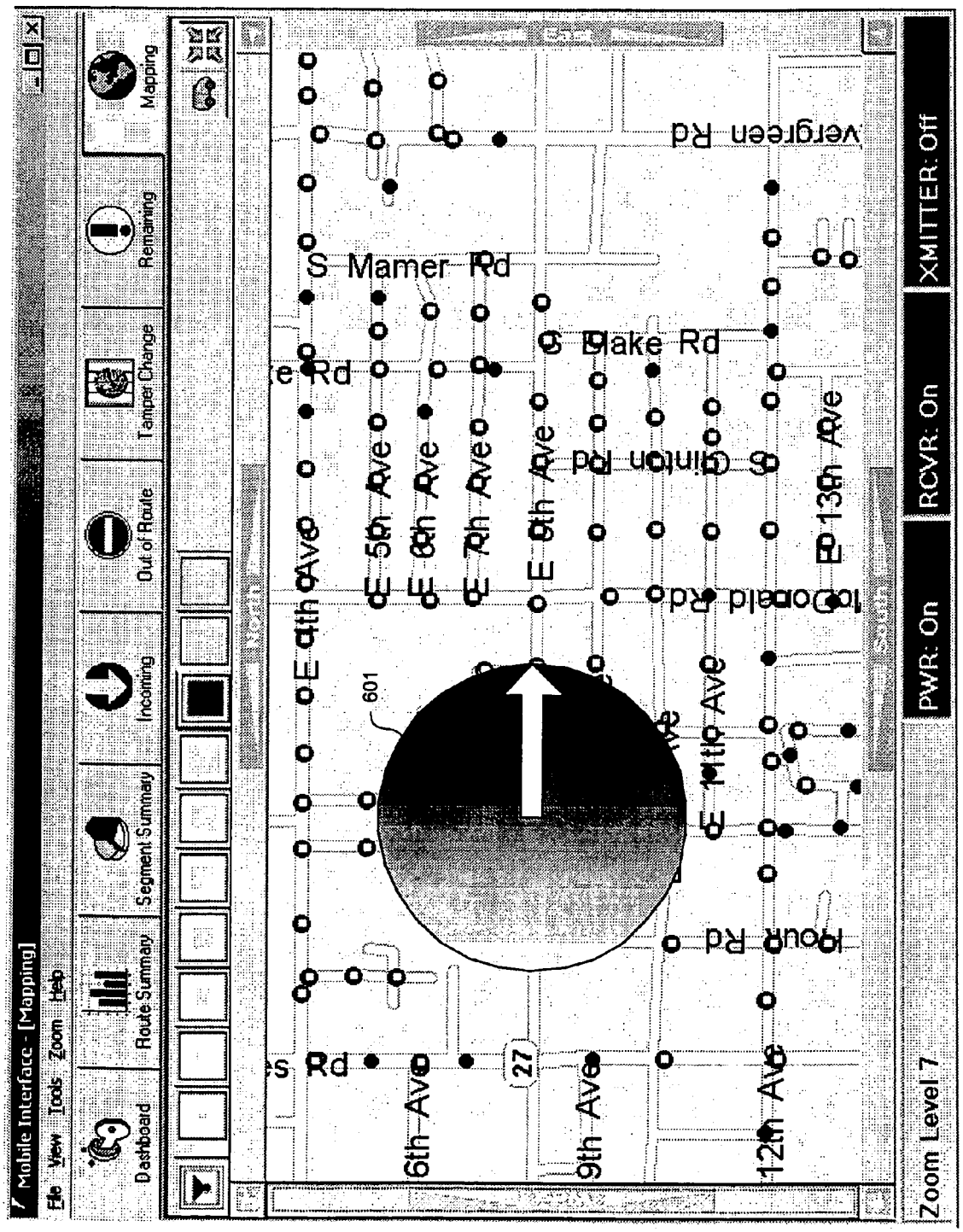
FIG. 6 is a display diagram showing an implementation of the data collection system in one embodiment.

FIG. 6 shows the movement of a dotted circle as endpoints move into and out of range of the mobile data collection system, illustrating application of the concepts discussed above. The circle with the arrow represents the range of readable endpoints. While a circle shape is shown here, the range may be better represented using an array of shapes (e.g., ellipses, irregular shapes, etc.) depending on the particular RF conditions. The arrow represents the direction of movement of the mobile data collection system. Within the circle, a predicted, time aware relative "link-level" reliability can be depicted by a color or shading pattern. The link-level reliability, in most cases, is dependent, at least in part, on the direction of travel.

IV. Route Sequencing Flows

Figure 7:
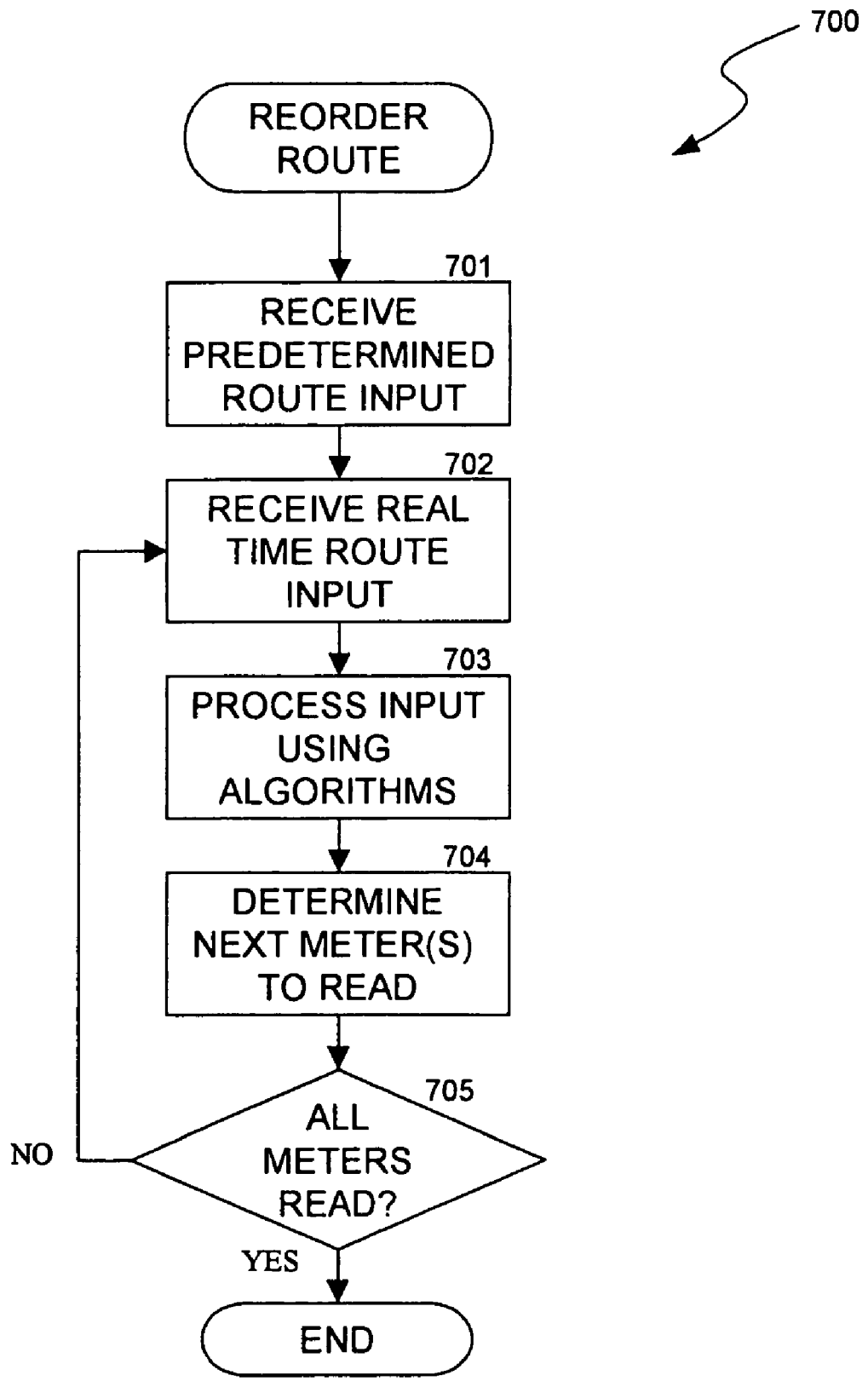
FIG. 7 is a flow diagram showing an example of a sequencing routine performed at the data collection system of FIGS. 1 and 2.
Figure 8:
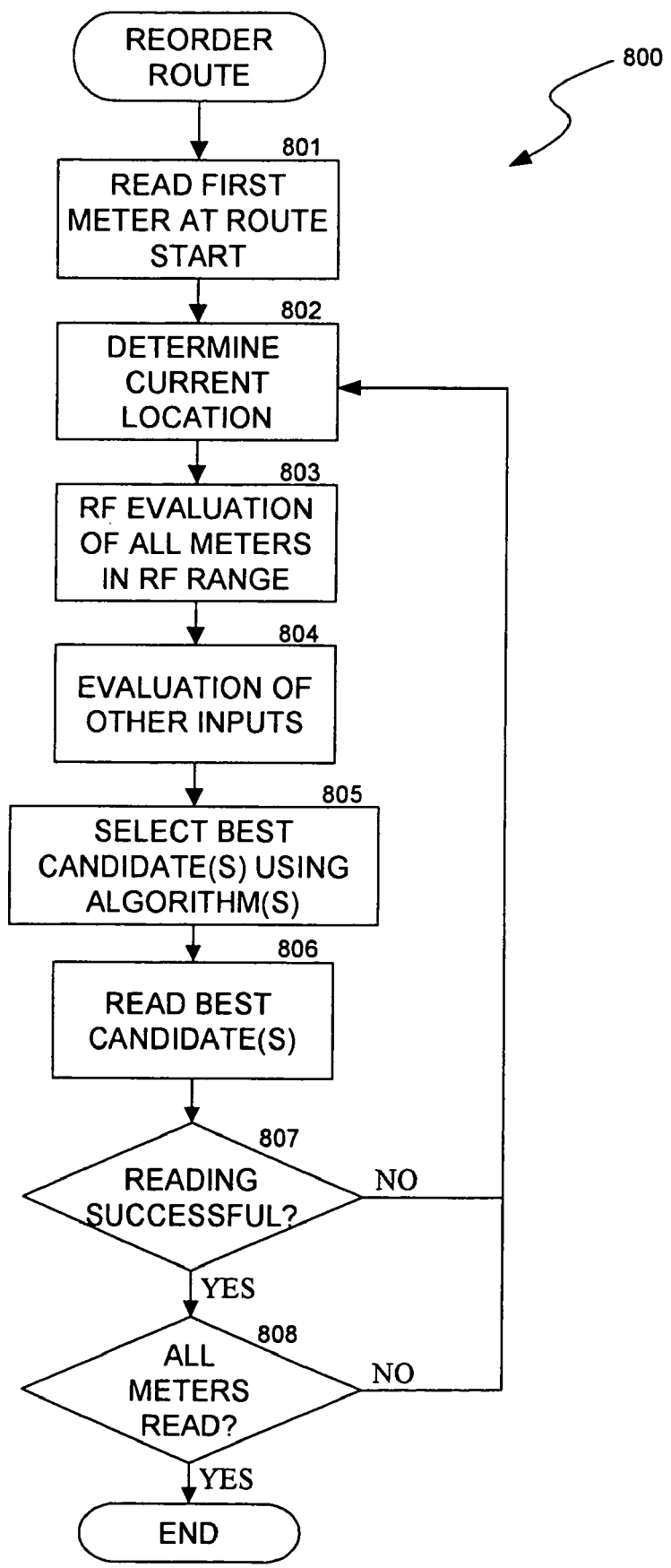
FIG. 8 is a flow diagram showing a more detailed example of a sequencing routine performed by the data collection system of FIGS. 1 and 2.

FIGS. 7 and 8 are representative flow diagrams that depict processes used in some embodiments. These flow diagrams do not show all functions or exchanges of data, but instead they provide an understanding of commands and data exchanged under the system. Those skilled in the relevant art will recognize that some functions or exchanges of commands and data may be repeated, varied, omitted, or supplemented, and other (less important) aspects not shown may be readily implemented.

Referring to FIG. 7, a high-level routine 700 for reordering or determining a sequence for endpoint communications may be executed, for example, in the data collection system 108 of FIGS. 1 and 2 (e.g., at the sequencing component 204). Throughout the routine 700, the data collection system may read multiple endpoints simultaneously. Thus, the algorithms used in the routine 700 may facilitate finding all endpoint(s) in the vicinity attempting communication with the data collection system. The routine 700 begins at block 701 with receiving predetermined route information such as a route definition including a sequence of meter identification addresses. At block 702, the routine 700 receives various "real-time" inputs, such as those described above with respect to FIG. 3. Some or all of the information may be stored, including topography, seasonal conditions, etc.

At block 703, the routine 700 employs one or more algorithms and/or subprocesses to resequence the communications. At block 704, the routine 700 determines the next endpoint or endpoints in the route to read, based on the processing at block 703. At decision block 705, if all endpoints in the route have been read, the routine 700 ends. Otherwise, the routine 700 loops back to block 702 to receive the most current real-time inputs. Each time the routine 700 executes, these real-time inputs may vary based on changing factors such as the current direction, position, and speed of the vehicle harboring the data collection system and the current environmental and RF conditions.

Referring to FIG. 8, a more detailed routine 800 for sequencing or sequencing communications with endpoints is presented. Like the routine 700 of FIG. 7, the routine 800 takes place in the data collection system, such as in the sequencing component, which may include an interference engine. Throughout, the routine 800, multiple endpoints may be read simultaneously. Thus, the algorithms used in the routine 800 facilitate finding all endpoints in the vicinity capable of communication with the data collection system.

The routine 800 begins at block 801, where an operator initiates reading endpoints in a designated route by initiating communication activities at a route start location. This can include manually selecting an endpoint as a first endpoint in the route, or otherwise initiating communication with at least one known endpoint.

At block 802, the routine 800 determines the current location of the data collection system. This may be done using many techniques including a supplied location coordinate, a real-time GPS coordinate, a location inferred by a first successful point-to-point connection performed in a predefined sequence, or by manual input performed by the operator. At block 803, the routine 800 evaluates potential candidate endpoints within RF range. At block 804, the routine 800 evaluates additional inputs, such as those described with respect to FIG. 3. At block 805, the routine 800 performs an algorithm to choose the best of the candidate endpoints for possible communication sessions. For example, it may select a meter or group of meters that is most likely to read successfully or most likely to go out of range soon due to direction of travel, and/or progress on a route.

At block 806, the data collection system attempts point-to-point communication with the selected endpoint or group of endpoints. At decision block 807, the routine 800 determines the degree of success of the communication with the selected endpoint or group of endpoints. If at decision block 807 the communication is unsuccessful, the routine 800 loops back to block 802, where the current location of the data collection system is redetermined. If, however, at decision block 807 the communication is successful, the routine 800 proceeds to decision block 809, where the routine 800 checks to see if all endpoints in the route have been read. If all endpoints in the route have been successfully read, the routine 800 ends. Otherwise, if at decision block 809 there are additional endpoints to read, the routine 800 loops back to block 802, where the current location of the data collection system is determined so that the next meter or meters can be selected.

V. Conclusion

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps or components are presented in a given order, alternative embodiments may perform routines having steps or components in a different order. The teachings of the invention provided herein can be applied to other systems, not necessarily the data collection system described herein. The elements and acts of the various embodiments described above can be combined to provide further embodiments and some steps or components may be deleted, moved, added, subdivided, combined, and/or modified. Each of these steps may be implemented in a variety of different ways. Also, while these steps are shown as being performed in series, these steps may instead be performed in parallel, or may be performed at different times.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." In addition, as used herein, the terms "connected," "coupled," or any variant thereof, means any connection or coupling, either direct or indirect, between two or more elements; the coupling of connection between the elements can be physical, logical, or a combination thereof. Words in the above detailed description using the singular or plural number may also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The teachings of the invention provided herein could be applied to other systems, not necessarily the system described herein. These and other changes can be made to the invention in light of the detailed description. The elements and acts of the various embodiments described above can be combined to provide further embodiments.

These and other changes can be made to the invention in light of the above detailed description. While the above description details certain embodiments of the invention and describes the best mode contemplated, no matter how detailed the above appears in text, the invention can be practiced in many ways. Details of the system, data model, and management scheme may vary considerably in their implementation details, while still being encompassed by the invention disclosed herein. As noted above, particular terminology used when describing certain features, or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments but also all equivalent ways of practicing or implementing the invention.

We claim:

1. A system for collecting automatically information associated with the use or monitoring of a utility, such as a gas, electric or water utility, the system comprising:
multiple endpoints each providing utility consumption data, wherein the multiple endpoints are grouped into one or more routes, and wherein each of the multiple endpoints includes a wireless transmitter for wirelessly transmitting data related to consumption of the utility; and
a mobile data collection system configured to communicate with the multiple endpoints, wherein the mobile data collection system includes:
an input collector configured to collect input data used in determining a next endpoint to be read for at least one of the one or more routes, wherein the input data includes one or more of real-time data, historical data, return signal strength indicator (RSSI) data, latitude/longitude data, sequence data for a particular route, data concerning the current location or velocity of the mobile data collection system, data relating to interfering RF emissions, temperature data, weather data, speed of the mobile data collection system as it moves through a route, data relating to terrain associated with the route, data relating to topology associated with the route, and street layout information;
a sequencing component coupled to the input collector, wherein the sequencing component is configured to process the input data collected by the input collector to determine a next endpoint to read while performing reading of endpoints of the one or more routes, wherein the processed data includes three or more distinct types of data; and
a receiver for communicating with the next endpoint to be read on the route and wirelessly receiving the data related to the consumption of the utility.

2. The system of claim 1 wherein the input collector collects input data while a route is executed.

3. The system of claim 1 wherein the input collector collects input data before a route is executed.

4. The system of claim 1 wherein the input collector collects input data both before and during route execution.

5. The system of claim 1 wherein each of the multiple endpoints is capable of point-to-point communication with the data collection system, and wherein the data collection system and the multiple endpoints each include a transceiver.

6. The system of claim 1 further comprising a receiver configured to receive route information independent of the input collector, wherein the route information includes a list of endpoints to be read on a specified route, and wherein the order of endpoints on the list does not influence the sequencing component.

7. The system of claim 1 wherein each of the multiple endpoints is equipped with a module for both sending and receiving data over a wireless link.

8. The system of claim 1 wherein the data collection system is a mobile meter reading system located in a vehicle.

9. A method for automatically reading endpoints used in tracking information associated with consumption of a utility, the method comprising:
receiving an indication of a collection of endpoints comprising a meter reading route, wherein each endpoint stores utility consumption data;
executing the meter reading route, including:
(a) identifying a first endpoint to be read on the meter reading route;
(b) wirelessly reading utility data from the first endpoint;
(c) receiving input data used in identifying a next endpoint to be read on the meter reading route, wherein the received data does not include Global Position System (GPS) data, or includes both GPS and additional data for automatically identifying the next end point to be read on the meter reading route;
(d) identifying a next endpoint to be read on the meter reading route based on the received input; and
(e) wirelessly reading utility data from the identified endpoint; and repeating (c), (d) and (e) until all the endpoints on the meter reading route are read or acknowledged as unreadable.

10. The method of claim 9 wherein the identifying of a next endpoint to be read includes:
selecting for reading, one or more endpoints within a range of communication, wherein the selecting is based, at least in part, on the received input;
attempting communication with the one or more selected endpoints;
evaluating the success of the communication; and
selecting a next endpoint for reading based on the success of the communication.

11. The method of claim 9 further comprising gathering non-consumption information while performing the meter reading route, wherein the non-consumption data relates to sequencing future routes.

12. The method of claim 9 further comprising gathering non-consumption information while performing the meter reading route, wherein the non-consumption data relates to the quality of the utility being delivered or data pertaining to the distribution system itself.

13. The method of claim 9 wherein the input used in identifying a next endpoint to be read on the meter reading route includes both real-time and historical input.

14. The method of claim 9 wherein the input used in identifying a next endpoint to be read on the meter reading route includes return signal strength indicator (RSSI) data.

15. The method of claim 9 wherein the input used in identifying a next endpoint to be read on the meter reading route includes latitude/longitude data.

16. The method of claim 9 wherein the input used in identifying a next endpoint to be read on the meter reading route includes data associated with current direction of travel through a route while reading endpoints.

17. The method of claim 9 wherein the input used in identifying a next endpoint to be read on the meter reading route includes the type of data to be communicated or exchanged with the endpoint.

18. The method of claim 9 wherein the input used in identifying a next endpoint to be read on the meter reading route includes data associated with an environmental factor that affects or interferes with RF communications.

19. The method of claim 9 wherein the input used in identifying a next endpoint to be read on the meter reading route includes environmental temperature data.

20. The method of claim 9 wherein the input used in identifying a next endpoint to be read on the meter reading route includes data associated with the current velocity of movement through a route while reading endpoints.

21. The method of claim 9 wherein the input used in identifying a next endpoint to be read on the meter reading route includes data associated with the current geographic position in a route while reading endpoints.

22. The method of claim 9 wherein the input used in identifying a next endpoint to be read on the meter reading route includes data associated with terrain or topology associated with the meter reading route.

23. The method of claim 9 wherein the input used in identifying a next endpoint to be read on the meter reading route includes data associated with roadways traveled to perform the meter reading route.

24. The method of claim 9 wherein the next endpoint to be read on the meter reading route is not fixed and is, instead, based on overall route efficiency prediction given current conditions.

25. A system for facilitating communication sessions between a mobile data collection system and one or more utility meters equipped with modules for sending and receiving data over a wireless link, the method comprising:
    means for receiving information associated with a meter reading route;
    means for identifying a first meter or first set of meters to be read on the meter reading route;
    means for receiving input used in identifying a next meter or set of meters to be read on the meter reading route, wherein the means for receiving is configured for receiving input while the meter reading route is in progress, and wherein the input does not include Global Positioning System (GPS) data, or includes both GPS data and additional data for use in automatically identifying the next meter or set of meters to be read on the meter reading route;
    means for identifying a next meter or set of meters to be read on the meter reading route, wherein the identifying is based on the input received by the means for receiving, and wherein the means for identifying is configured for identifying a next meter or set of meters while the meter reading route is in progress; and
    means for communicating with the next identified meter or set of meters, wherein the communicating includes receiving meter reading data from the identified meter.

26. The system of claim 25 wherein at least some of the meters communicate with the mobile data collection system using broadcast communication techniques.

27. The system of claim 25 wherein at least some of the meters communicate with the mobile data collection system using wake-up communication techniques.

28. The system of claim 25, further comprising storage means for storing at least one of route information, algorithms used in finding efficient sequences for communicating with meters, and collected utility consumption data.

29. A computer-readable medium containing instructions for performing a method associated with sequencing an order of endpoints to be read while performing a meter reading route using an at least partially automated mobile data collection system, the method comprising:
    receiving information used in determining a probability of successfully communicating with one or more endpoints on the meter reading route; and
    if there are multiple candidate endpoints for point-to-point communication during a given time while performing the meter reading route, determining the probability of success of communicating with each of such possible candidate endpoints based, at least in part, on the received information and a current geographic location of the mobile data collection system.

30. The computer-readable medium of claim 29 wherein determining the probability of success includes applying a virtual circle with a configurable radius around the mobile data collection system to analyze the multiple candidate endpoints within a current range.

31. The computer-readable medium of claim 29 wherein the method further comprises adjusting the determination of the probability of success based on the current direction of travel, speed of the mobile data collection system, or both.

* * * * *